United States Patent
Niemann et al.

(10) Patent No.: US 6,431,043 B1
(45) Date of Patent: Aug. 13, 2002

(54) MOBILE MACHINE TOOL, ESPECIALLY TABLE SAW

(75) Inventors: Bernhard Niemann, Haselünne; Hermann Rugen, Meppen, both of (DE)

(73) Assignee: Elektra Beckum AG, Meppen (DE)

( * ) Notice: Subject to any disclaimer, the term of this patent is extended or adjusted under 35 U.S.C. 154(b) by 0 days.

(21) Appl. No.: 09/700,739

(22) PCT Filed: May 20, 1999

(86) PCT No.: PCT/EP99/03473

§ 371 (c)(1), (2), (4) Date: Nov. 20, 2000

(87) PCT Pub. No.: WO99/59773

PCT Pub. Date: Nov. 25, 1999

(30) Foreign Application Priority Data

May 20, 1998 (DE) .................... 298 09 768 U

(51) Int. Cl.$^7$ ............................. B27B 27/04; B27B 3/28
(52) U.S. Cl. ....................................... 83/477.2; 83/494
(58) Field of Search ............................... 83/477.2, 491, 83/494

(56) References Cited

U.S. PATENT DOCUMENTS

| | | | |
|---|---|---|---|
| 4,170,155 A | * 10/1979 | Saito et al. ................ 318/601 |
| 4,321,516 A | 3/1982 | Ohtsuka | |
| 4,338,558 A | * 7/1982 | Okamatsu et al. .......... 318/802 |
| 4,489,261 A | * 12/1984 | Hartwig et al. ............ 318/700 |
| 4,784,192 A | * 11/1988 | Raggiotti ................... 144/35.2 |
| 4,793,228 A | * 12/1988 | Etter et al. ................. 83/155.1 |
| 4,852,434 A | * 8/1989 | Bald .......................... 279/135 |
| 5,105,698 A | * 4/1992 | Dunham .................... 144/242.1 |
| 5,123,317 A | * 6/1992 | Barnes et al. .............. 83/477.1 |
| 5,185,911 A | * 2/1993 | Upson ........................ 29/401.1 |
| 5,644,205 A | * 7/1997 | Nguyen Phuoc et al. ... 318/138 |
| 6,008,605 A | * 12/1999 | Weigel et al. ............. 318/430 |
| 6,229,232 B1 | * 5/2001 | Roth-Stielow et al. ..... 310/160 |

FOREIGN PATENT DOCUMENTS

| | | |
|---|---|---|
| DE | 30 26 474 | 1/1981 |
| DE | 35 05 041 | 8/1986 |
| DE | 297 21 332 | 12/1997 |

* cited by examiner

Primary Examiner—M. Rachuba
Assistant Examiner—Jason Prone
(74) Attorney, Agent, or Firm—Nixon Peabody LLP; David S. Safran

(57) ABSTRACT

A portable machine tool, especially a portable table saw, having an outer casing, an electric drive motor (2) arranged in the casing, and a connecting device (3) for connecting the drive motor to a power supply network having a low system frequency, and a tool (4), especially a circular saw blade, that is driven by the drive motor (2) in which the drive motor is a synchronous or asynchronous motor, the connecting device is a frequency converter (5) which converts the low system frequency of the power supply network to a high operating frequency, the drive motor operating at a high speed corresponding to that of the high operating frequency while the tool is driven at a lower speed suitable for machining purposes by being coupled to the drive motor via a speed-reducing gear train (6).

14 Claims, 2 Drawing Sheets

MOBILE MACHINE TOOL, ESPECIALLY TABLE SAW

BACKGROUND OF THE INVENTION

1. Field of the Invention

The invention relates to a portable machine tool, particularly a portable table saw having an outer casing, an electric drive motor in the casing, a connecting device for connecting the motor to a power supply network with a low system frequency, and a tool driven by the drive motor.

The invention relates to a mobile machine tool which is to be understood as neither a firmly installed, nor a hand-held machine tool, rather a machine tool which sits on a table or a stand in order to perform the machining of the workpiece; however, as far as size and weight go, it is constructed so that it can be transported from place to place, advisably able to be carried by one or two people.

2. Description of Related Art

A mobile machine tool of the type to which the invention is directed is known (German Utility Model No. U 297 21 232). This is only one example of a type of portable machine tool, such machine tools having been known in the art for decades.

Weight is especially important for mobile machine tools. This is substantially defined by the weight of the electric drive motor, at least when considerable shaft power is required, as, for example, in table circular saws. In order to keep the weight of this type of mobile machine tool as low as possible, universal motors are used. These run with a high rotational speed, build small and have a comparably low weight. A shaft power of 1 kW at 18,000 RPM means a motor weight of 1.5 to 2.0 kg and over-all dimensions of 0.75 1 for a universal motor.

For machine tools, particularly table circular saws, universal motors are therefore problematic in practice because they are sensitive to wear due to their required collector ring and required brushes. Wear is increased even more, especially for table circular saws, through the dust-filled surroundings.

The object of the invention is to develop a more wear-resistant mobile machine tool, particularly a table circular saw, of the sort in question at a low as possible weight.

SUMMARY OF THE INVENTION

The above-mentioned object is met with a mobile machine tool described in the preamble by the features of the characterizing part of claim 1. According to the invention, a substantially maintenance-free asynchronous motor is used as an electric drive motor. The use of an asynchronous motor for machine tools is, naturally, fundamentally known. Until now, however, the weight and space conditions for asynchronous motors were seen as hindering so that asynchronous motors have only been used reluctantly for mobile machine tools. At the least, the weight of the mobile machine tools was, then, comparably high. This is because an asynchronous motor is tied to the system frequency with its rotational speed. The rotational speed is slightly less than the synchronous rotational speed which is determined by the quotient of the system frequency divided by the number of pole pairs. At a normal system frequency of 50 Hz, a shaft power of 1 kW at 3000 RPM re-quires a motor weight of 8.0 to 10.0 kg and a dimension requirement of the asynchronous motor of 1.5 to 2.0 liters. The portion of iron and coils of the asynchronous motor are decisive for the weight and volume of the asynchronous motor.

The asynchronous motor is operated with a considerably higher operating frequency by the inventively suggested combination of the asynchronous motor with a frequency converter. Through this, a substantially higher rotational speed is reached. At the given shaft power, a substantially smaller asynchronous motor is needed which has a substantially lower weight and less volume. The weight of the mobile machine tool which is equipped with the asynchronous motor having a frequency converter is thus considerably lowered since the weight of the frequency converter is barely of consequence. The total reduction of weight and volume is estimated at about 50% in comparison to the asynchronous motors used until now not having a frequency converter.

At similar electrotechnical starting positions, a synchronous motor which is tied precisely to the rotational speed of the rotary field, i.e. shows no slip-page, can also be used in place of an asynchronous motor.

The invention is described below in greater detail with reference to the accompanying drawings which show a single embodiment of the invention.

DETAILED DESCRIPTION OF THE INVENTION

Figure 1:
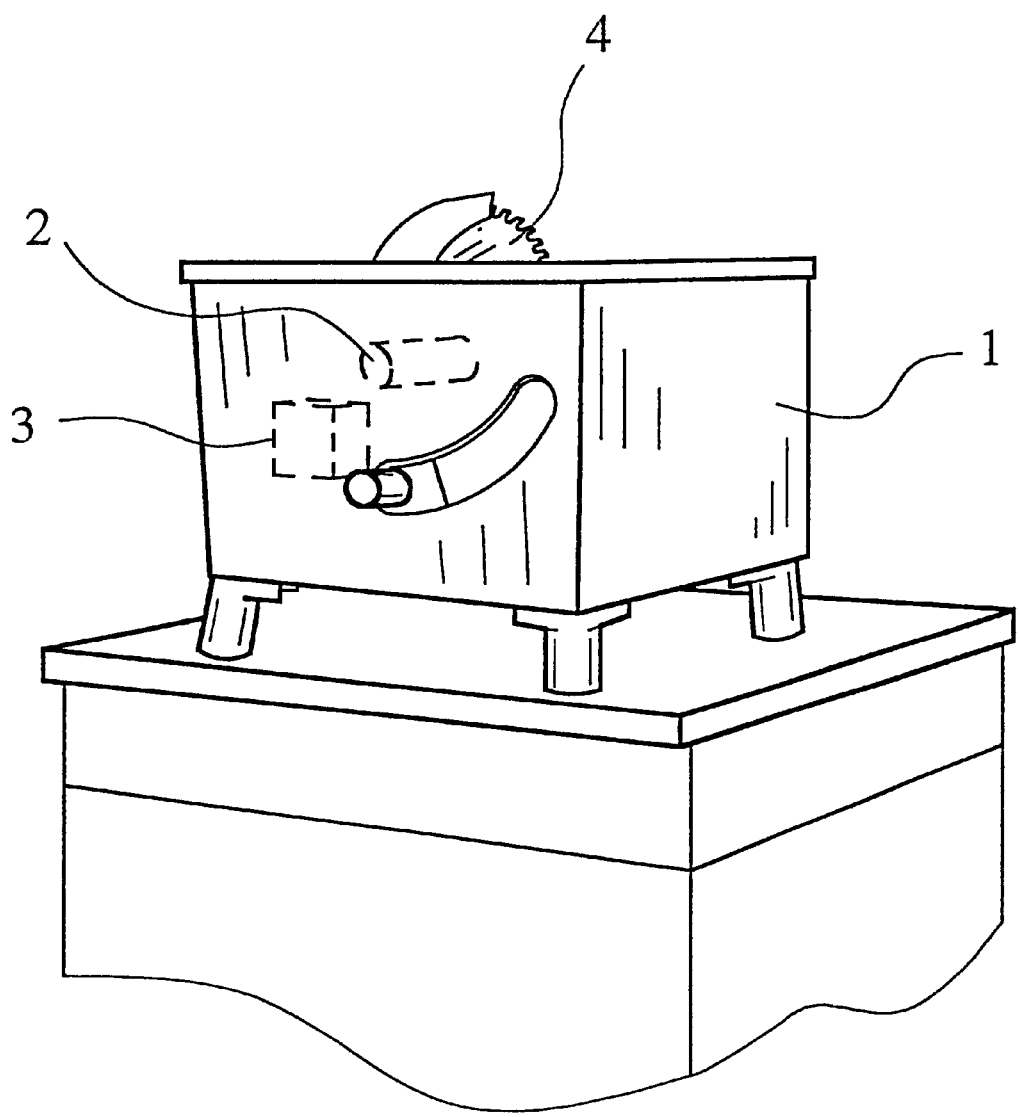
FIG. 1 a schematic representation of a mobile machine tool, in the case of this example, a table circular saw, FIG. 2 a circuit diagram of the machine tool according to the invention.

The mobile machine tool represented in FIG. 1 is, in the embodiment, a table circular saw comprising a casing 1, an electric drive motor 2 which is arranged in the casing and merely suggested, and a connecting device 3 for this electric drive motor 2 with which this electric drive motor 2 is connected to a generally lower system frequency. The system frequency in Germany is 50 Hz for the normal domestic system, in the USA, for example, it is 60 Hz.

A tool 4 of the machine tool, which is a saw blade of the table circular saw in the represented and preferred embodiment, is driven by the drive motor 2.

Figure 2:
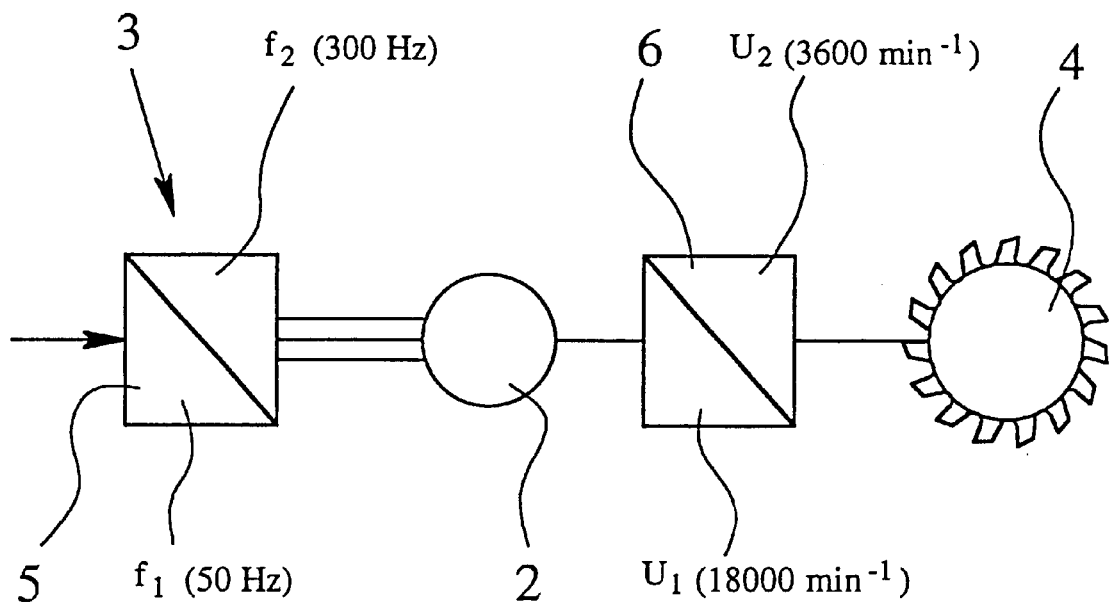

FIG. 2 now makes it clear that the electric drive motor 2, which is configured as an asynchronous motor, is connected to the electric mains via a frequency converter 5 within the connecting device 3. Nowadays, frequency converters 5 are available on the market in a plurality of embodiments, the relevant publications of the suppliers of such frequency converters 5 can be referred to. The low system frequency is changed to a high operating frequency for the drive motor 2 through the frequency converter 5, in the case of the example represented, to a frequency of 300 to 400 Hz. An electric drive motor 2 which is configured as an asynchronous motor, then runs with a correspondingly higher rotational speed, which is determined by the quotient of the operating frequency divided by the number of pole pairs. If the asynchronous motor has a rotational speed of 3000 RPM in operation at 50 Hz, it will have a rotational speed of 18,000 RPM at 300 Hz and a rotational speed of 24,000 RPM at 400 Hz.

It is essential that at a high rotational speed, a determined shaft power, e.g. 1 kW, is reached with a substantially lower-weight asynchronous motor because the portion of iron and coils is lower than in an asynchronous motor of the same shaft power operating at a lower rotational speed. This has all already been described in detail in the general part of the description.

FIG. 2 further shows that the electric drive motor 2, here in the form of an asynchronous motor, is connected via a speed-reducing gear train 6 to the tool 4, here the saw blade of the bench circular saw, which is operated at a correspondingly lower rotational speed, in this case a rotational speed of 3600 or 4800 RPM.

In place of an asynchronous motor, a precisely system-driven synchronous motor can be used.

The considerably lower weight due to the higher operating frequency and the considerably lower volume are essential for the asynchronous motor which is usable in this respect in a mobile machine tool and can show all its known advantages of maintenance-freedom in unfavorable surrounding conditions.

What is claimed is:

1. A portable machine tool comprising:

an outer casing;

an electric drive motor which is arranged in the casing;

a connecting device for connecting the drive motor to a power supply network with a low system frequency; and a tool driven by the drive motor;

wherein the connecting device comprises a frequency converter means for changing the low system frequency of the power supply network to a high operating frequency for operation of the drive motor; the electric drive motor operating at awiger rotational speed corresponding to the higher operating frequency; and wherein the electric drive motor is coupled to the tool by a speed reduction gear train for rotating the tool a workpiece machining speed that is lower than the rotational speed of the electric drive motor.

2. A portable machine tool according to claim 1, wherein the electric drive motor is an asynchronous motor.

3. A portable machine tool according to claim 2, wherein the system frequency is 50 Hz.

4. A portable machine tool according to claim 2, wherein the operating frequency is in the range of 300 to 400 Hz.

5. A portable machine tool according to claim 4, wherein the rotational speed of the electric drive motor corresponding to the higher operating frequency is a rotational speed in the range of 18,000 to 24,000 rpm.

6. A portable machine tool according to claim 5, wherein the rotational speed of the tool is in the range of 3600 to 4800 rpm.

7. A portable machine tool according to claim 2, wherein the portable machine tool is a table top circular saw and the tool driven by the drive motor is a circular saw blade.

8. A portable machine tool according to claim 6, wherein the system frequency is 50 Hz, and wherein the portable machine tool is a table top circular saw and the tool driven by the drive motor is a circular saw blade.

9. A portable machine tool according to claim 1, wherein the electric drive motor is a synchronous motor.

10. A portable machine tool according to claim 9, wherein the system frequency is 50 Hz.

11. A portable machine tool according to claim 9, wherein the operating frequency is in the range of 300 to 400 Hz.

12. A portable machine tool according to claim 11, wherein the rotational speed of the electric drive motor corresponding to the higher operating frequency is a rotational speed in the range of 18,000 to 24,000 rpm.

13. A portable machine tool according to claim 12, wherein the rotational speed of the tool is in the range of 3600 to 4800 rpm.

14. A portable machine tool according to claim 13, wherein the portable machine tool is a table top circular saw and the tool driven by the drive motor is a circular saw blade.

* * * * *